March 31, 1931.    F. O. HOAGLAND    1,798,841
JOURNAL BEARING
Filed Sept. 27, 1926
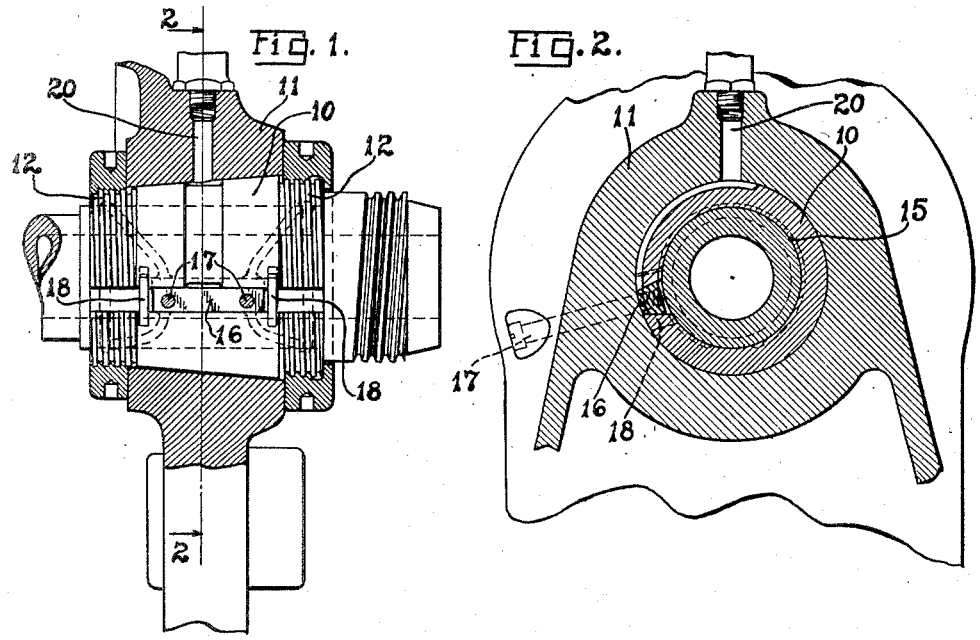
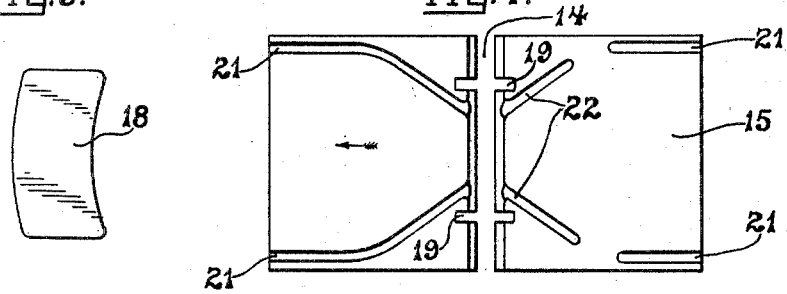
INVENTOR
F. O. Hoagland
BY
Joseph K. Schofield
ATTORNEY Patented Mar. 31, 1931

1,798,841

UNITED STATES PATENT OFFICE

FRANK O. HOAGLAND, OF BRIDGEPORT, CONNECTICUT, ASSIGNOR TO PRATT & WHITNEY COMPANY, OF NEW YORK, N. Y., A CORPORATION OF NEW JERSEY

JOURNAL BEARING

Application filed September 27, 1926. Serial No. 137,980.

This invention relates to journal bearings and in particular to an adjustable bearing adapted primarily for the spindles of metal cutting machines.

An object of the present invention is to provide a split adjustable bearing with improved oil retaining means so that the bearing surfaces for the journal within the bearing can be constantly supplied with oil.

Another object of the invention is to provide a split adjustable bearing with an opening extending longitudinally of the axis of the bearing within which is inserted a spreading member adapted to expand the bearing to fit its supporting member.

Another object of the invention is to provide closing members or gates within the bearing for retaining the oil within the longitudinal opening of the bearing member, these members serving to close the opening at its opposite ends, these gates entering recesses or grooves within the bearing member on opposite sides of the opening.

Another object of the invention is to provide oil spreading grooves within the bearing surface of the member designed to permit oil to flow from the space within the longitudinal opening between the closing pieces or gates throughout the cylindrical bearing surface and be returned to the reservoir formed by the opening on the opposite side of the bearing.

With these and other objects in view, my invention consists in the features of construction and operation set forth in the following specification and illustrated in the accompanying drawing.

In the accompanying drawing annexed hereto and forming a part of this specification, I have shown the invention embodied in a bearing for the tool spindle of a lathe or milling machine, but it will be understood that the invention can be otherwise embodied and that the drawing is not to be construed as defining or limiting the scope of the invention, the claims appended to this specification being relied upon for that purpose.

In the drawing:

Figure 1 is a side view in section of the improved bearing shown in operative position within the headstock of a lathe.

Fig. 2 is an end view of the bearing taken on line 2—2 of Fig. 1.

Fig. 3 is an enlarged detail view of one of the members, and

Fig. 4 is a development of the bearing surfaces of the bearing member disclosing the arrangement of the oil grooves.

In the above mentioned drawing I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: First, a frusto-conical member split longitudinally of its axis along one side; second, a cylindrical bearing surface formed within this frusto-conical member; third, adjusting means for positioning the member axially within its support so that the member may be axially adjusted and slightly compressed to compensate for wear; fourth, closing pieces or gates inserted within the frusto-conical member adjacent the ends of the split portion or opening and extending completely across this opening; fifth, an expanding or wedge member engaging the walls of this split portion of the bearing; sixth, adjusting means for forcing this expanding member outwardly; and seventh, oil spreading grooves formed within the bearing surface of the frusto-conical member.

Referring more in detail to the figures of the drawing, I show my improved split adjustable journal bearing mounted within the headstock of a lathe and adapted to rotatably support one end of the headstock spindle. This bearing comprises a member 10, the outer surface of which is frusto-conical, and adapted to closely engage correspondingly formed surfaces in the headstock 11 of the machine tool. On the opposite ends of this member 10 are threaded extensions 12 adapted to be engaged by nuts 13 bearing against the faces of the headstock 11 so that by adjusting these nuts 13 the axial position of the frusto-conical member 10 can be varied. This forms a means of adjusting this member 10 to compensate for wear.

Along one side of this frusto-conical member 10 is an opening 14 extending completely through the wall of the frusto-conical member 10 and extending throughout its length. It will be seen, therefore, that adjustment of the axial position of the frusto-conical member 10 will permit expanding or contracting of the diameter of the cylindrical bearing surface 15 formed interiorly on this member 10. Within this split portion of the frusto-conical member 10 is inserted a bar of wedge form 16 which engages the opposite walls of the longitudinal opening 14. This wedge member is engaged by the inner ends of suitable adjusting screws 17. By adjusting these screws 17, the wedge member 16 may be forced outwardly to expand the frusto-conical member 10 and cause its outer surfaces to tightly engage the walls of the opening in the headstock 11 or other member supporting it. Also by this wedge member 16 the frusto-conical member 10 is retained fixed against rotation within its support 11.

Inserted within this frusto-conical member 10 are closing pieces or gates 18 extending transversely across the split portion 14 of of the bearing member 10 and having their opposite ends engaged within suitable recesses 19 formed in the frusto-conical member 10 adjacent this split portion 14. Preferably these closing pieces or gates 18 may be secured by being soldered to one side of the opening 14 so that they will be retained in position but will be free to enter the opposite recesses 19 as the frusto-conical member 10 is adjusted to compensate for wear. These closing members or gates 18 shown in detail in Fig. 3 have their inner and outer surfaces curved to correspond to the diameters respectively of the journal surface and of the outer diameter of the frusto-conical member 10 at the points where the closing members 18 are positioned. Also, as shown clearly in Fig. 1, these closing pieces or gates 18 are spaced apart and disposed approximately at the ends of the frusto-conical portions of the bearing member 10. As the inner edges of these closing pieces closely contact with the journal surface 15 of the bearing 10 and the outer edges contact with the walls of the support 11 within which the bearing 10 is mounted, the space between the gates forms a small enclosed reservoir. To this enclosed oil reservoir oil may be supplied in any preferred manner, as by means of the oil conduit 20 extending through the walls of the support 11 or head-stock and the frusto-conical member 10.

Referring to Fig. 4, a development of the cylindrical bearing surface 15 of the bearing member 10 is shown. It will be noted that within this surface 15 are formed oil spreading grooves 21 extending approximately throughout the length of the inner cylindrical surface. The direction of rotation of the journal relative to this bearing surface is indicated by the arrow and the disposition of the grooves 21 is governed thereby. It will be seen, therefore, that due to the rotative motion of the journal and the disposition of the grooves 21, oil will be carried along the grooves 21 from one side of the small reservoir completely around the bearing surface 15. On the opposite side of the opening 14 the oil will be returned to the reservoir within the closing pieces or gates 18 by short obliquely disposed grooves 22. Throughout a major portion of the bearing surfaces the oil grooves 21 extend approximately along the edges of the bearing surfaces but at no place do they extend out through the opposite ends. In this manner the oil is prevented from being thrown from the bearing surface 15 but is allowed to spread uniformly throughout the bearing surface and be returned to the reservoir on the opposite side of the split portion or opening 14.

What I claim is:

1. A journal bearing comprising in combination, a frusto-conical member open along one side and having a bearing surface co-axial therein, means to secure said member axially and non-rotatably in position within a support, closing pieces positioned within said member adjacent the ends of said opening and having their inner and outer edges curved to conform to the diameters of the inner and outer surfaces of said member whereby oil may be retained and constantly supplied to the bearing surface, and oil grooves formed in the bearing surface of said member and entering said opening.

2. An adjustable journal bearing comprising in combination, a frusto-conical member having an axial opening along one side and having a bearing surface co-axial therein, an expanding member positioned within said axial opening, means to force said expanding member outwardly, closing pieces inserted within said frusto-conical member and extending across said axial opening into slots formed therein, and oil spreading grooves within the bearing surface of said frusto-conical member and entering opposite sides of said opening.

3. An adjustable journal bearing comprising in combination, a frusto-conical member having an axial opening along one side and having a bearing surface co-axial therein, means to adjust said member axially as it becomes worn, an expanding member positioned within said axial opening, means to force said expanding member outwardly, closing pieces inserted within slots formed within said frusto-conical member and extending across said axial opening and forming gates at the opposite ends thereof, and oil spreading grooves within the bearing surface of said frusto-conical member and entering opposite sides of said opening.

4. An adjustable journal bearing comprising in combination, a frusto-conical member having an axial opening along one side and having a bearing surface co-axial therein, means to adjust said member axially as said bearing surface becomes worn, an expanding member positioned within said axial opening, means to force said expanding member outwardly in any axially adjusted position, closing pieces inserted within said frusto-conical member and extending across said axial opening into slots formed on opposite sides of said opening so that said closing pieces may extend deeper into said slots as said member is axially adjusted, and oil spreading grooves within the bearing surface of said frusto-conical member, said grooves entering the axial opening of said member.

In testimony whereof, I hereto affix my signature.

FRANK O. HOAGLAND.